United States Patent [19]
Jäger

[11] 3,860,374
[45] Jan. 14, 1975

[54] AUXILIARY APPARATUS FOR CUTTING AND PUNCHING OUT BANDS OF DOUGH MOUNTABLE AT A DOUGH ROLLING MACHINE HAVING DRIVEN DOUGH ROLLERS

[75] Inventor: Hans-Joachim Jäger, Burgdorf, Switzerland

[73] Assignee: Gustave Auguste Seewer, Burgdorf, Switzerland

[22] Filed: Nov. 6, 1972

[21] Appl. No.: 304,118

Related U.S. Application Data
[62] Division of Ser. No. 159,633, July 6, 1971, abandoned.

[30] Foreign Application Priority Data
Nov. 20, 1970  Germany............................ 2057212

[52] U.S. Cl............. 425/161, 425/315, 425/302 R, 425/184, 425/196
[51] Int. Cl............................................ A21c 11/04
[58] Field of Search........ 425/161, 162, 302 R, 315, 425/363, 367, 184, 185, 196, 161, 315; 83/399, 400, 433, 563, 564

[56] References Cited
UNITED STATES PATENTS

| | | | |
|---|---|---|---|
| 347,492 | 8/1886 | Marshall................................ | 83/482 |
| 1,566,602 | 12/1925 | Hounsell et al..................... | 425/184 |
| 2,275,714 | 3/1942 | Anetsberger et al........... | 425/363 X |
| 2,571,201 | 10/1951 | Clem.................................... | 83/482 |
| 3,023,714 | 3/1962 | Seewer................................ | 425/367 |
| 3,238,830 | 3/1966 | Backlund......................... | 83/482 X |

Primary Examiner—Francis S. Husar
Assistant Examiner—David S. Safran
Attorney, Agent, or Firm—Werner W. Kleeman

[57] ABSTRACT

An auxiliary apparatus for cutting and punching out dough bands adapted to be mounted at a dough rolling machine, the dough rollers of which are driven by a drive mechanism at selectively adjustable speeds. This auxiliary apparatus comprises a cutting mechanism mountable at one of both conveyor bands of the dough rolling machine. This cutting mechanism embodies a shaft having a pair of actuation levers commonly seated thereon. A respective support rod member is pivotably mounted at its lower end with an associated one of each such actuation lever and a respective carrier element is attached to the upper end of each support rod member. At least one respective threaded spindle is mounted at each carrier element for actuation to carry out an up and down movement, and a support is arranged at the lower end of each threaded spindle which carries at least one cutting tool rotatably mounted thereat. Means serve to cause the drive mechanism to shift to a lower rotational speed upon adjustment of the cutting tools from their rest position into their work position.

5 Claims, 3 Drawing Figures

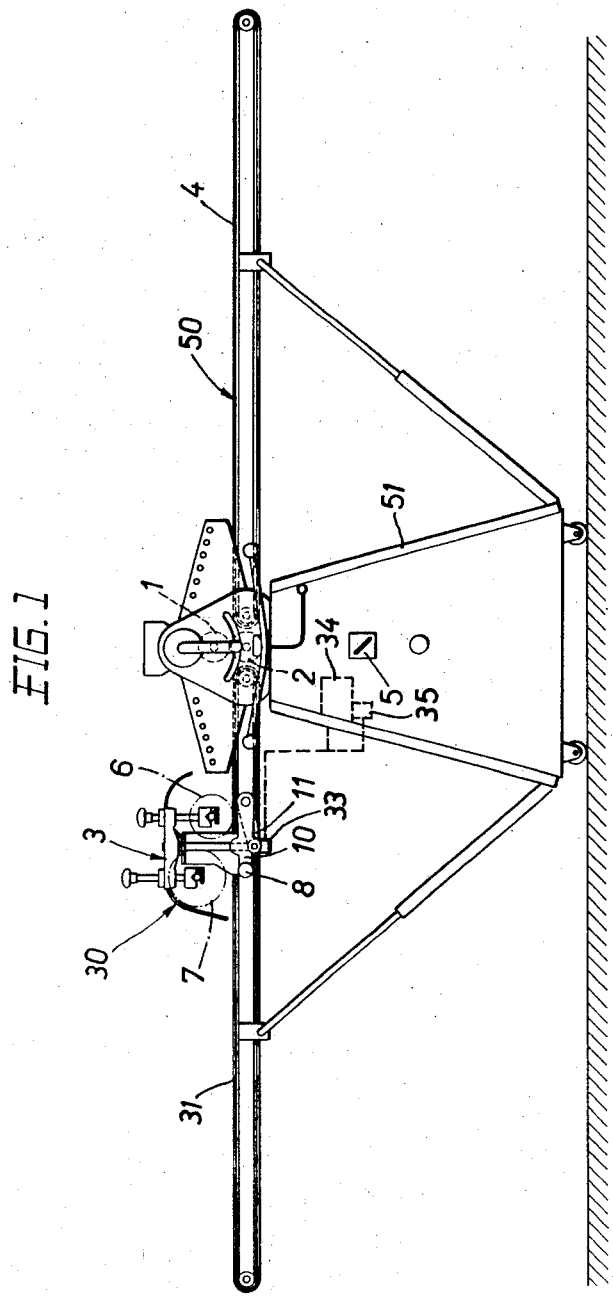

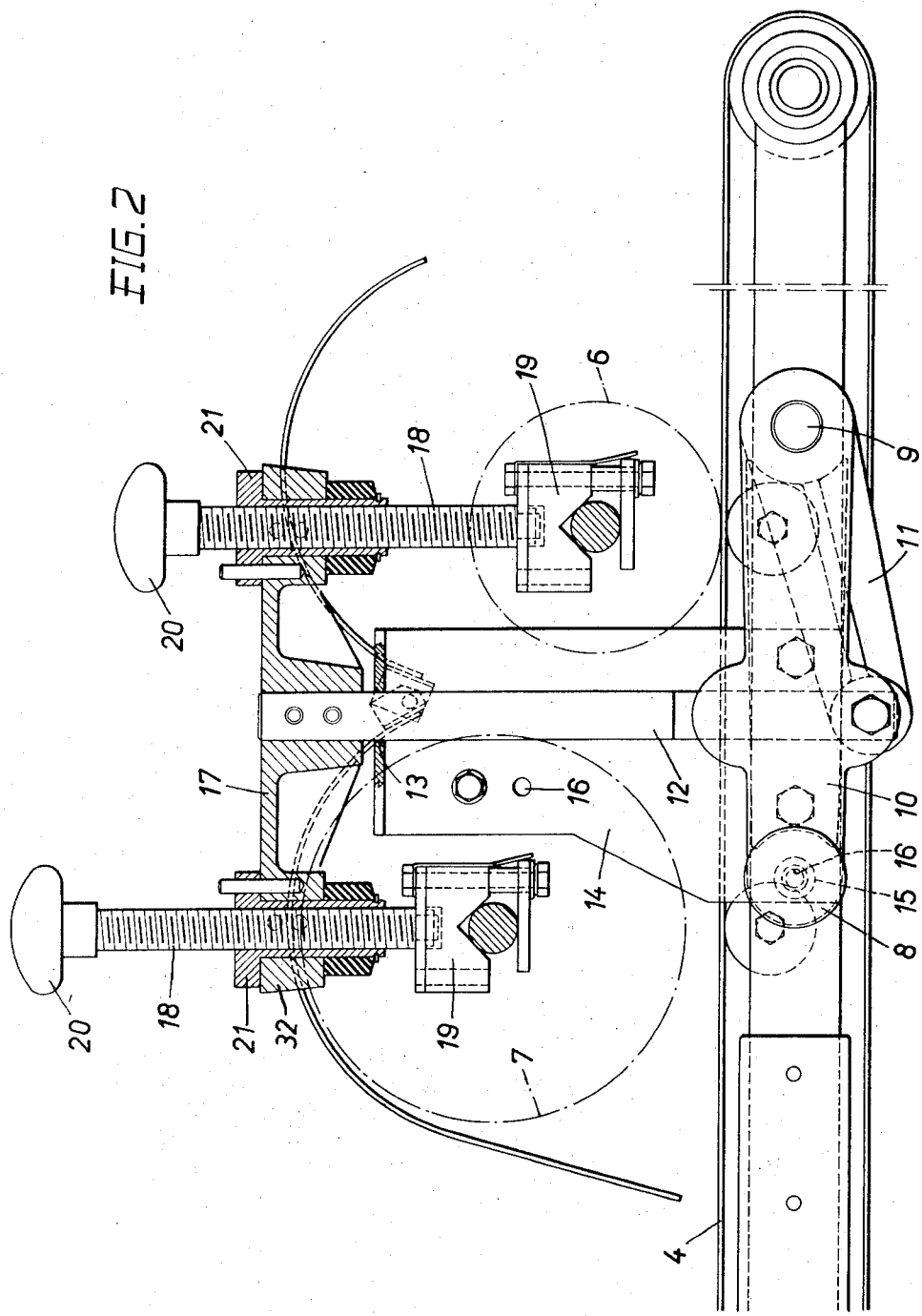

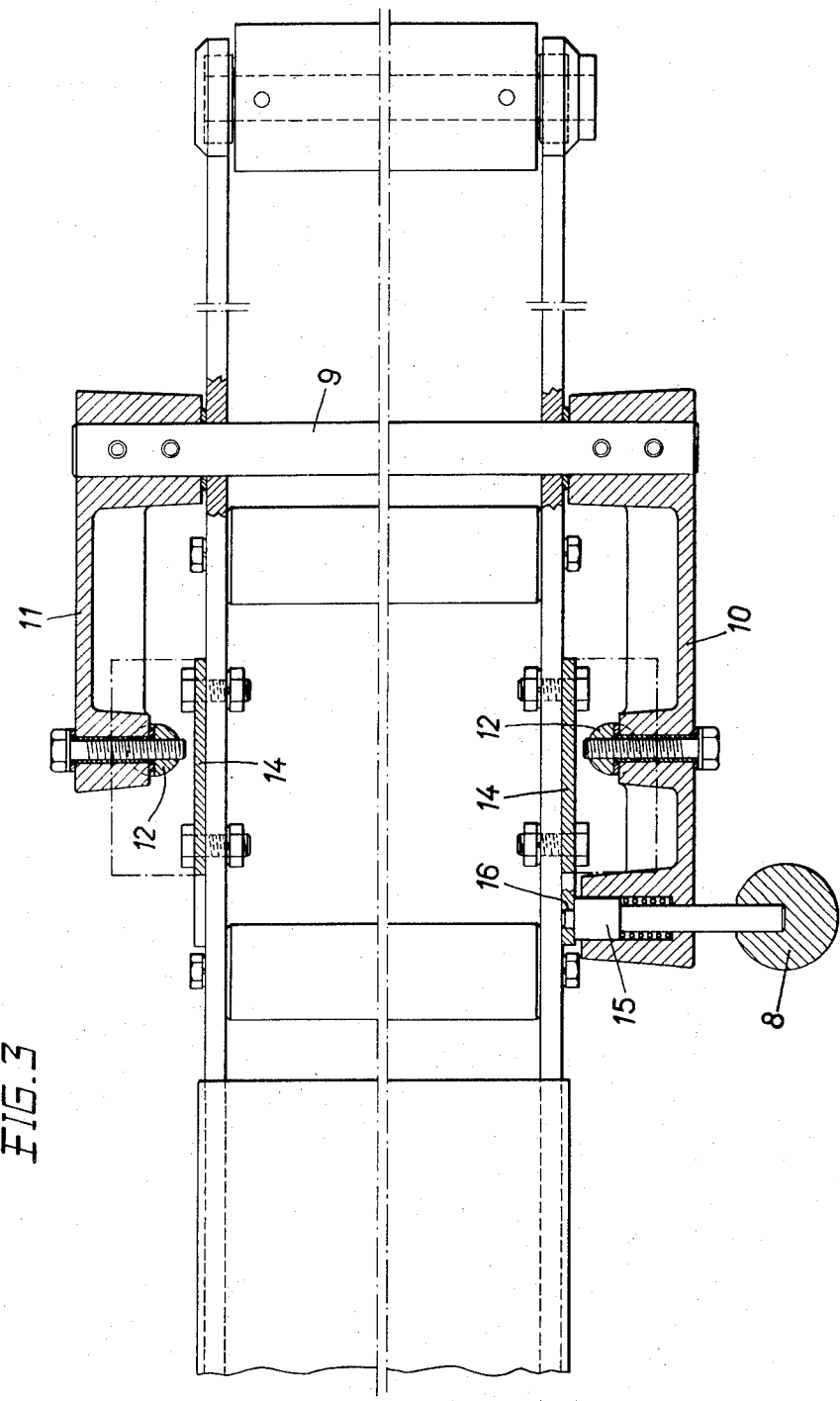

AUXILIARY APPARATUS FOR CUTTING AND PUNCHING OUT BANDS OF DOUGH MOUNTABLE AT A DOUGH ROLLING MACHINE HAVING DRIVEN DOUGH ROLLERS

CROSS-REFERENCE TO RELATED CASE

This application is a divisional application of my copending, commonly assigned, U.S. application, Ser. No. 159,633, filed July 6, 1971, now abandoned.

BACKGROUND OF THE INVENTION

The present invention relates to a new and improved auxiliary apparatus for cutting and punching or stamping out bands of dough and adapted to be mounted as an attachment to a dough rolling machine of the type equipped with two superimposed rollers for rolling-out the dough, with conveyor bands arranged to each side of such pair of superimposed rollers.

In the baking and confectionary industry dough is rolled-out into bands or strips of desired width and thickness. After these bands of dough have been rolled-out into a final thickness governed by the weight of the products to be baked they are further processed through cutting and punching out dough sections of optional shape. To carry out these operations previously it was necessary to resort to the use of at least two different pieces of equipment, something which generally hardly could be considered by small and medium size businesses because of reasons of economy and space.

For the same reasons it was usually out of the question to consider continuous working of a quantity of dough in a single direction of travel or pass, followed by the direct punching-out of the dough sections in the same working operation, as such is standard operating procedure for larger size industries or concerns in this type of business.

Oftentimes, however, a small or medium size concern was already in possession of a dough rolling machine having a pair of superimposed rollers for producing the bands of dough in a to-and-fro operation. However, the transport or conveyor bands arranged to both sides of this machine were used, during the rolling-out of the dough, for the actual transport of the dough. Furthermore, by virtue of the relatively high operating speeds which prevail at such type equipment it was not possible to cleanly and accurately cut the dough bands. Moreover, for the same reasons it was impossible to remove the punched or stamped out dough pieces or sections from the outgoing or discharge transport band.

SUMMARY OF THE INVENTION

Therefore, from what has been explained above it will be recognized that a real need still exists in the art for extending the versatility and usefulness of conventional dough rolling machinery, particularly for satisfying the requirements of smaller and medium sized concerns where cost and space considerations do not permit specialized machinery for each of the required working operations in the processing of dough as previously explained. Hence a primary objective of this invention is to provide a novel auxiliary apparatus for attachment to such dough rolling machine so as to fullfil the previously explained need in the art.

It is a further significant object of the present invention, with one and the same piece of equipment or machinery, to provide the possibility of:

a. rolling-out dough bands without difficulty and obstruction in a to-and-fro technique;

b. after achieving the weight-governed final thickness and without any loss in time, to place a cutting- and punching-out apparatus for the dough into its working position; and c. also adjusting the required considerably reduced operating speed.

Still a further significant object of the instant invention is the provision of a novel and improved construction of auxiliary apparatus for cutting- and punching-out dough bands which can serve as an attachment to existing dough rolling machines of the type having a pair of superimposed dough rollers and a respective conveyor band disposed to each side of such pair of rollers, wherein the placement into operation of the auxiliary apparatus can be undertaken effortlessly and reliably without any complicated manipulations or readjustment in the equipment.

Yet a further significant object of this invention relates to a novel auxiliary apparatus useful as an attachment to existing dough rolling machines and serving for the cutting- and punching-out of dough bands so as to extend the versatility and usefulness of such dough rolling machinery.

Now, in order to implement these and still further objects of the invention, which will become more readily apparent as the description proceeds, the invention contemplates the provision of the aforementioned auxiliary apparatus which embodies a cutting mechanism mounted to one of the two conveyor bands of the dough rolling machine. This cutting mechanism embodies two actuation levers which are fixedly seated upon a common shaft, a support or carrier rod member being pivotably mounted at its lower end with each such actuation lever. There is also provided a respective carrier element which is attached to the upper end of each support rod member. At least one respective threaded spindle which can be actuated to move up and down is arranged at each carrier element, each threaded spindle having mounted at its lower end a respective support or bearing arrangement, with at least one cutting tool being rotatably mounted in such support. Means serve to cause the drive mechanism to shift to a lower rotational speed upon adjustment of the cutting tools from their rest position into their work position.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic elevational view of a dough rolling machine equipped with the auxiliary apparatus of this invention mounted as an attachment thereto;

FIG. 2 is an enlarged, partially sectional view, in elevation, of the attachment or auxiliary apparatus of the arrangement of FIG. 1; and FIG. 3 is a top plan view, also partially in section, of the auxiliary apparatus depicted in FIG. 2.

DETAILED DESCRIPTION OF THE PREFERRED EMBODIMENTS

Turning now to the drawings, in the arrangement of FIG. 1 there is shown schematically a conventional dough rolling machine, generally indicated by reference character 50, which is equipped with the inventive auxiliary apparatus, generally referenced by numeral 30, and serving for cutting- and punching-out dough bands produced by the dough rolling machine 50. Inasmuch as the dough rolling machine 50 is of conventional design only enough of the structural details thereof will be considered herein to allow one versed in the art to fully understand its cooperable association with the auxiliary apparatus 30. Hence dough rolling machine 50 has a pair of superimposed rollers 1 and 2 for rolling out the dough into bands, and within, for instance, the housing 51 of this dough rolling machine there may be accommodated a suitable drive mechanism 34 rotating the rolls 1, 2 at one of two selective rotational speeds which are different from one another. A switch 5 allows change over from one speed to the other speed as required for the particular operation then to be performed by the equipment. During such time as the dough is being rolled out in a normal to-and-fro technique whereby the dough is passed successively back and forth by the transport or conveyor bands 31 and 4 to both sides of the pairs of rolls 1, 2 the machine is set for operating at the higher rotational speed. Hence the dough is successively passed by the transport bands 31 and 4 a number of times between the dough rolling-out rollers 1 and 2 in accordance with the composition of the dough material.

Now before the last pass of the dough through the rollers 1, 2, that is to say, prior to attaining the final or terminal thickness of the dough mass, the dough band is guided upon the transport or conveyor band 4 which is situated opposite the cutting mechanism 3 of the auxiliary apparatus 30. Now the switch 5 is actuated so as to switch-over the machine to operate at the lower rotational speed, the nip or gap between the rollers 1, 2 is adjusted to a spacing corresponding to the desired final thickness of the dough band corresponding to the required unit weight of the articles to be produced, and the cutting elements or rolls 6 and 7 of the cutting device 3 are then placed into their working position through actuation of the handgrip 8, and thereafter the dough band is rolled down to the desired final or terminal thickness and delivered to the cutting mechanism 3.

Now with the construction and arrangement of auxiliary apparatus shown with particular reference to details thereof in FIGS. 1 and 2 it will be seen that a continuous shaft 9 is rotatably mounted at the table of the transport band 31 located at the left-side of the dough rolling machine 50. At both ends of this continuous shaft 9 there are mounted both of the actuation levers 10 and 11. Actuation levers 10 and 11 are fixedly attached to the common shaft 9 so as to assume the exact same angular position with respect to one another which, in turn, ensures that the tension or support rods 12 which are hingedly connected with both of the previously mentioned actuation levers 10 and 11, and owing to their additional support in the bores 13 of the sheet metal carrier members 14 attached likewise to both sides of the table of the transport band 13, will carry out a similar vertical movement. This vertical movement is arrested in either a rest position or a working position by means of a locking or blocking mechanism 15 accommodated in the actuation lever 10, arresting of this vertical movement being carried out in conjunction with two locking bores 16 or the like provided at the sheet metal carrier member 14, as best seen by referring to FIG. 3. In other words by manipulating the handgrip 8 it is possible to shift the actuation lever 10 into either a rest position or a working position and thereby similarly place the cutting elements 6 and 7 either into the desired rest or working position.

At the upper end of both of the previously considered traction or support rods 12 there is fixedly seated a respective double-arm carrier element 17. At the hubs 32 of these carrier elements 17 which are in parallelism to one another there is mounted and resiliently supported a respective threaded spindle 18 equipped with the associated sliding bushing 21. At the lower end of each such threaded spindle 18 there is supported a support member or bearing 19 for the cutting elements or rolls 6 and 7 and at the upper respective ends of each such threaded spindle 18 there is arranged the operating handgrip 20.

By virtue of the described construction it is possible to:

a. use within the contemplated range cutting rollers or elements of optional diameter; and
b. accommodate the cutting pressure indivually to the momentarily encountered product or medium to be cut.

Furthermore it will be seen that the adjusted cutting pressure is maintained even when the cutting mechanism 3 is placed in its ineffectual or raised position so that an adjustment correction is only then necessary when changing the cutting rollers or elements for different ones possessing a different outside diameter.

It is also mentioned that the adjustment of both operating speeds of the combined dough rolling- and cutting machine 30, 50 can be undertaken as follows:

a. by switching a pole switchable electric motor having two operable rotational speeds;
b. by electronic sectional-control of a normal asynchronous electric motor; and
c. by an infinitely adjustable variable drive, mechanically or hydraulically.

It is possible within the framework of the present invention, to undertake a number of different modifications to the described embodiment. For instance, the carrier element 17 could be designed so as to only possess a single arm, whereby then only one cutting tool, such as 6 or 7, would be provided.

Finally, it is mentioned that the system could be designed such that during such time as there is undertaken adjustment of the cutting mechanism 3 from a rest position into its work position there is automatically performed an adjustment or speed regulation of the drive mechanism from a higher to a lower value, or else a locking mechanism could be placed into its effectual position to prevent the drive mechanism working at its upper rotational speed instead of its lower rotational speed. Such a system design has been schematically illustrated in FIG. 1 wherein a switch 33 can be actuated when moving the cutting mechanism 3 into its effectual work position, switch 33 then acting upon the drive mechanism 34 to shift it to its lower rotational speed for the drive of the rollers 1, 2, or else acting upon the locking mechanism 35 to render such effectual and to block the drive mechanism 34 to prevent the latter from operating at the higher rotational speed.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. The combination with a dough rolling machine having two superimposed dough rollers and a respective conveyor band disposed to each side of said pair of rollers, and a drive mechanism for driving said rollers at selectively adjustable rotational speeds, of an auxiliary apparatus for cutting- and punching- out dough bands, said auxiliary apparatus comprising a cutting mechanism mountable at one of said conveyor bands, said cutting mechanism embodying a shaft, a pair of actuation levers seated upon said shaft, a pair of support rod members, each of said support rod members being pivotably mounted at its lower end with an associated one of said actuation levers, a pair of carrier elements, each of said carrier elements being attached to the upper end of an associated support rod member, at least one threaded spindle mounted at each carrier element for actuation so as to be movable up and down, a support at the lower end of each threaded spindle, at least one cutting tool rotatably mounted in each said support and movable between a lower working position and an upper rest position, and means for automatically shifting said drive mechanism to a lower rotational speed upon adjustment of the cutting tools from their rest position into their work position.

2. The combination as defined in claim 1, wherein each carrier element is constructed as a double-arm member, each arm thereof carrying one of said threaded spindles, and wherein two of said cutting tools are provided at each carrier element.

3. The combination as defined in claim 1, further including a threaded bushing provided for each threaded spindle, said threaded bushing being mounted to be vertically displaceable and upwardly resiliently supported at each said carrier element.

4. The combination as defined in claim 3, wherein one of said actuation levers is equipped with a resiliently supported locking bolt, means providing a pair of stationary locking openings, said locking bolt being selectively engageable with one or the other of said pair of stationary locking openings in order to selectively lock said actuation lever and the therewith connected components in either a lower working position or an upper rest position.

5. The combination as defined in claim 4, wherein said shifting means includes at least one locking mechanism which, upon adjustment of the cutting tools from their rest position into their work position, is shiftable into an effectual position preventing the drive mechanism from working at its higher rotational speed instead of its lower rotational speed.

* * * * *